（12）United States Patent
Arndt et al.

(10) Patent No.: US 7,023,459 B2
(45) Date of Patent: Apr. 4, 2006

(54) VIRTUAL LOGICAL PARTITION TERMINAL

(75) Inventors: Richard Louis Arndt, Austin, TX (US); Robert Kimberlin Foster, Austin, TX (US); Walter Manfred Lipp, Georgetown, TX (US); Kerry Alan Lucas, Round Rock, TX (US); Casey Lee McCreary, Liberty Hill, TX (US); Bruce Mealey, Austin, TX (US); Joshua Nathan Poimboeuf, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 09/798,296

(22) Filed: Mar. 1, 2001

(65) Prior Publication Data

US 2002/0124152 A1 Sep. 5, 2002

(51) Int. Cl.
*G09G 5/00* (2006.01)

(52) U.S. Cl. ........................................ 345/764; 718/104
(58) Field of Classification Search ................. 345/778, 345/781, 783, 810, 736, 764, 767, 779; 709/229, 709/228, 232, 249; 718/104; 710/3, 5, 16, 710/48, 104, 312, 20, 36, 51
See application file for complete search history.

(56) References Cited

U.S. PATENT DOCUMENTS

| | | | | | |
|---|---|---|---|---|---|
| 5,479,599 | A | * | 12/1995 | Rockwell et al. | 345/837 |
| 5,877,764 | A | * | 3/1999 | Feitelson et al. | 345/808 |
| 6,530,078 | B1 | * | 3/2003 | Shmid et al. | 717/138 |
| 6,654,830 | B1 | * | 11/2003 | Taylor et al. | 710/74 |

FOREIGN PATENT DOCUMENTS

JP 06-012296 1/1994 ............... 11/32

* cited by examiner

*Primary Examiner*—Ba Huynh
(74) *Attorney, Agent, or Firm*—Sawyer Law Group LLP

(57) ABSTRACT

A method and system for providing a computer system having a plurality of logical partitions with a virtual terminal is disclosed. The computer system is coupled to an external display device through a single communications interface. The method and system include allowing the logical partitions to share the communications interface by multiplexing communications to the display device for each of the logical partitions over the communication interface. Windows are displayed on the display device for each of the logical partitions, and the communications from each of the logical partitions is then routed to the corresponding window for display on the display device.

13 Claims, 1 Drawing Sheet

VIRTUAL LOGICAL PARTITION TERMINAL

FIELD OF THE INVENTION

The present invention relates to multiprocessor computer systems, and more particularly to providing a logical partition multiprocessor computer system with a virtual terminal.

BACKGROUND OF THE INVENTION

Logical partitioning is the ability to make a single multiprocessing system run as if it were two or more independent systems. Each logical partition represents a division of resources in the system and operates as an independent logical system. Each partition is logical because the division of resources may be physical or virtual. An example logical partitions is the partitioning of a multiprocessor computer system into multiple independent servers, each with it own processors, main storage, and I/O devices.

Typically, all computer systems have a serial port or graphics card that can be used to display information necessary for an operator to control the system. An example of such information is the display of system menus that allow an operator to maintain the hardware and software of the system. System menus are used to set up boot devices, add or delete hardware from the system, and run system diagnostics when problems are encountered.

When a multiprocessor computer system has been logically partitioned, an operator needs to be able to call up system menus for each logical partition in order to maintain its hardware and software. The problem is that most computer systems only have one serial port or graphics card, and in a logical partition system, such hardware can only be assigned to one of the logical partitions. Therefore, only that logical partition will be able to display its system menus. In order to access the system menus for the other logical partitions, the operator would have to buy and install a serial card or graphics card for each of the partitions, and use multiple displays and keyboards in order to maintain the system.

Accordingly, what is needed is a method and system for displaying information from each of the logical partitions on one console. The present invention addresses such a need.

SUMMARY OF THE INVENTION

The present invention provides a method and system for providing a computer system having a plurality of logical partitions with a virtual terminal, wherein the computer system is coupled to an external display device through a single communications interface. The method and system include allowing the logical partitions to share the communications interface by multiplexing communications to the display device for each of the logical partitions over the communication interface. Windows are displayed on the display device for each of the logical partitions, and the communications from each of the logical partitions is then routed to the corresponding window for display on the display device.

Accordingly, the present invention provides the logical partitions with the ability to share the hardware needed to display the system menus. The need for the operator to buy hardware for each logical partition in the system to support the system menus is eliminated. In addition, the operator may maintain the entire system from one interface instead of having to use multiple displays and keyboards.

DESCRIPTION OF THE INVENTION

Figure 1:
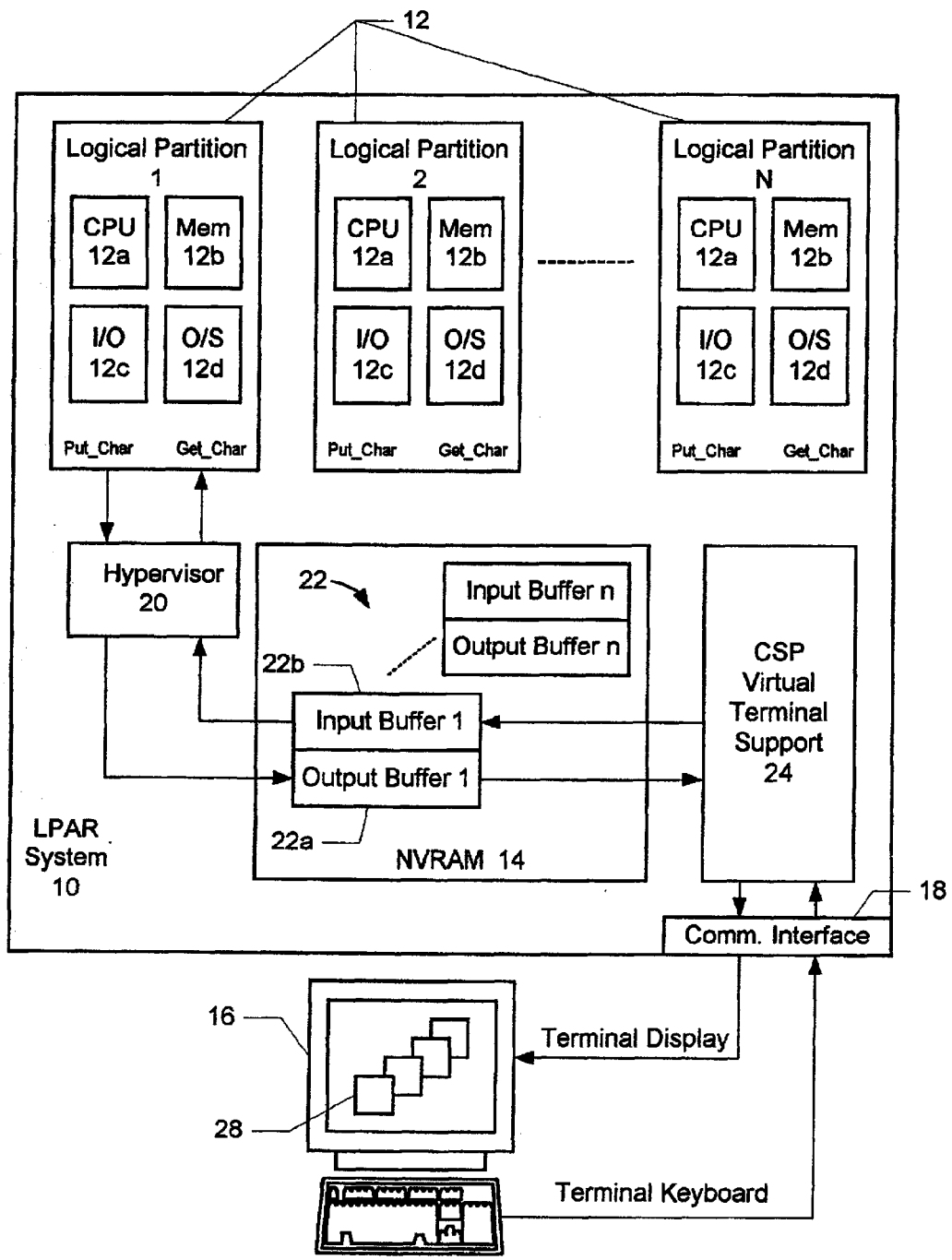
FIG. 1 is a block diagram illustrating a dataflow for providing a logical partition (LPAR) computer system with a virtual terminal in accordance with a preferred embodiment of the present invention.

The present invention relates to providing a logical partition computer system with a virtual terminal. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

FIG. 1 is a block diagram illustrating a dataflow for providing a logical partition (LPAR) computer system with a virtual terminal in accordance with a preferred embodiment of the present invention. The system 10 includes multiple logical partitions 12, and a nonvolatile random access memory (NVRAM) 14. Each logical partition 12 has its own processor(s) 12a, memory 12b, and I/O devices 12c, and may run its own operating system 12d independently of the other logical partitions 12. In a preferred embodiment, the system 10 may have up to sixteen logical partitions 12. The LPAR system 10 is coupled to an external hardware service console (HSC) 16 through a single communications interface 18. In a preferred embodiment, the HSC 16 may be implemented using a conventional PC running the Linux™ operating system, and appropriate application software.

In order for an operator to maintain the logical partitions 12, each logical partition 12 needs to display service menus and the operator needs to be able to type-in commands for each logical partition 12. As shown, however, the LPAR system 10 typically only has one communications interface 18 for displaying information on the HSC 16. In a preferred embodiment, the communications interface 18 may represent a graphics card, a serial port, or an ethernet port, for instance.

In order to solve this problem, the present invention virtualizes the HSC 16 by allowing each of the logical partitions 12 to share the communications interface 18. This is accomplished by multiplexing communications for each other logical partitions 12 over the communications interface 18 to and from the HSC 16, and by opening a window 28 for each of the logical partitions 12 on the HSC 16 for displaying service menus for the corresponding logical partition 12. The communication from the communications interface 18 for each logical partition 12 is then routed to the corresponding window 28 for display on the HSC 16. Commands typed into the respective windows 28 on the HSC 16 using a keyboard are routed back to the corresponding logical partition 12.

According to the present invention, the LPAR system 10 is provided with the virtual terminal through a combination of hypervisor software 20, a set of input/output buffers 22 (input buffer 22a and output buffer 22b) in the NVRAM 14 for each logical partition 12, and CSP virtual terminal support software (hereinafter CSP) 24. The hypervisor 20 is a program that allows the logical partitions 12 to share hardware independently by responding to function calls made by programs running on the logical partitions 12. The CSP 24 is a program that handles communication over the communications interface. In a preferred embodiment, hypervisor 20 and the CSP 24 run on separate processors, although the two programs may also run on the same processor. The hypervisor 20 and the CSP 24 use the input/output buffers 22 corresponding to each logical partition 12 to buffer characters going to and from the HSC 16 for the corresponding logical partition 12.

In operation, when programs running on each of the logical partitions 12 need to display information on the HSC 16 or receive information from HSC 16, the programs make a function call to the hypervisor 20. If the function call is to display information, the hypervisor 20 routes the information to the output buffer 22a assigned to the logical partition 12 making the call. In a preferred embodiment, the programs make a "put_char" function call to place individual characters in the output buffer 22a, and make a "get_char" function call to retrieve characters from input buffer 22b.

The CSP 24 multiplexes the information to and from input output buffers 22 to the HSC 16 via the communications interface 18. CSP 24 cycles through each of the output buffers 22a, and if any have data, the CSP 204 outputs the data over the communications interface 18. The HSC 16 then routes the information received from a particular logical partition 12 over the communications interface 18 to the corresponding window 28 for display.

An operator may enter commands into each of the windows 28 displayed on HSC 16 using a keyboard. The characters from the keyboard are sent through the communications interface 18 to the CSP 24, and the CSP 24 places the characters into the input buffer 22b for the appropriate logical partition 12. When a program running on a logical partition 12 issues a "get_char" function call, the hypervisor 20 retrieves the characters from input buffer 22b and returns the characters to the program.

In accordance with the present invention, the combination of hypervisor software 20, the input/output buffers 22, and the CSP 24 allow the logical partitions 12 to share to the hardware needed to display system menus. The present invention eliminates the need for dedicated serial ports or graphics cards for each logical partition 12 and allows an operator to maintain the entire system 10 from one interface 16, instead of having multiple displays and keyboards.

A method and system for providing a logical partition computer system with a virtual terminal has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A logical partition (LPAR) computer system including a plurality of logical partitions, each capable of running independently from the other logical partitions, comprising:
   a single serial port;
   an external display device coupled to the computer system through the serial port, the display device displaying a plurality of windows corresponding to each of the logical partitions; and
   virtual terminal means for allowing the logical partitions to display system menus on the display device through the serial port by,
      multiplexing communications to the display device for each of the logical partitions over the serial port by using input/output buffers corresponding to each of the logical partitions to store information from and to the logical partition and
      routing the communications from each of the logical partitions to the corresponding window for display on the display device by cycling through the input/output buffers, and outputting any data therein over the serial port.

2. The system of claim 1 wherein the virtual terminal means accepts function calls from the logical partitions and stores the information into the corresponding input/output buffers.

3. The LPAR system of claim 2 wherein the virtual terminal means cycles through the input/output buffers, and outputs any data therein over the communications interface.

4. The LPAR system of claim 1 wherein the virtual terminal means accepts keyboard characters entered into the windows on the display device and places the characters into the input/output buffer for the appropriate logical partition.

5. The LPAR system of claim 4 wherein when one of the logical partitions issues a function call for input, the virtual terminal means retrieves the characters from corresponding input/output buffer and returns the characters to the logical partition.

6. A method for providing a computer system having a plurality of logical partitions with a virtual terminal for displaying information from the logical partitions, the computer system coupled to an external display device through a single serial port, the method comprising:
   (a) allowing the logical partitions to share the serial port by multiplexing communications to the display device for each of the logical partitions over the serial port, wherein input/output buffers corresponding to each of the logical partitions are used to store information from and to the logical partition;
   (b) displaying a window on the display device for each of the logical partitions; and
   (c) routing the communications from each of the logical partitions to the corresponding window for display on the display device by cycling through the input/output buffers, and outputting any data therein over the serial port.

7. The Method of claim 6 wherein step (b) further includes the step of accepting function calls from the logical partitions and storing the information into the corresponding input/output buffers.

8. The Method of claim 6 further including the step of:
   (e) accepting keyboard characters entered into the windows on the display device; and
   (f) placing the characters into the input/output buffer for the appropriate logical partition.

9. The Method of claim 8 wherein step (b) further includes the steps of: when one of the logical partitions issues a function call for input, retrieving the characters from corresponding input/output buffer and returning the characters to the logical partition.

10. A computer-readable medium containing program instructions for providing a computer system having a plurality of logical partitions with a virtual terminal for displaying information from the logical partitions, the computer system coupled to an external display device through a single serial port, the program instructions for:
   (a) allowing the logical partitions to share the serial port by multiplexing communications to the display device for each of the logical partitions over the serial port, wherein input/output buffers corresponding to each of the logical partitions are used to store information from and to the logical partition;
   (b) displaying a window on the display device for each of the logical partitions; and (c) routing the communications from each of the logical partitions to the corresponding window for display on the display device by cycling through the input/output buffers, and outputting any data therein over the serial port.

11. The Computer-readable medium of claim 10 wherein instruction (a) further includes the instruction of accepting function calls from the logical partitions and storing the information into the corresponding input/output buffers.

12. The Computer-readable medium of claim 10 further including the instruction of:

(d) accepting keyboard characters entered into the windows on the display device; and (e) placing the characters into the input/output buffer for the appropriate logical partition.

13. The Computer-readable medium of claim 12 wherein instruction (a) further includes the instructions of: when one of the logical partitions issues a function call for input, retrieving the characters from corresponding input/output buffer and returning the characters to the logical partition.

* * * * *

UNITED STATES PATENT AND TRADEMARK OFFICE
CERTIFICATE OF CORRECTION

| | |
|---|---|
| PATENT NO. | : 7,023,459 B2 |
| APPLICATION NO. | : 09/798296 |
| DATED | : April 4, 2006 |
| INVENTOR(S) | : Arndt et al. |

Page 1 of 1

It is certified that error appears in the above-identified patent and that said Letters Patent is hereby corrected as shown below:

<u>Column 4</u>

Line 6, add --LPAR-- after "The" and before "system".

Signed and Sealed this

Fifth Day of September, 2006

JON W. DUDAS
*Director of the United States Patent and Trademark Office*